United States Patent [19]

Wolfers et al.

[11] 4,219,674

[45] Aug. 26, 1980

[54] PEROXIDE INITIATORS

[75] Inventors: Heinrich Wolfers, Rheurdt; Oskar Walter, Krefeld; Hans Rudolph, Krefeld; Hans J. Rosenkranz, Krefeld, all of Fed. Rep. of Germany

[73] Assignee: Bayer Aktiengesellschaft, Fed. Rep. of Germany

[21] Appl. No.: 969,099

[22] Filed: Dec. 13, 1978

[30] Foreign Application Priority Data

Dec. 22, 1977 [DE] Fed. Rep. of Germany ....... 2757442

[51] Int. Cl.² .......................................... C07C 170/00
[52] U.S. Cl. ..................................... 568/559; 252/186
[58] Field of Search ......................... 568/559; 252/186

[56] References Cited

U.S. PATENT DOCUMENTS

| Re. 28,818 | 5/1976 | Eyemans | 568/559 |
|---|---|---|---|
| 2,927,084 | 3/1960 | Wahl | 252/186 |
| 3,462,370 | 8/1969 | Wintz et al. | 252/186 |
| 3,538,011 | 11/1970 | van der Klaauw | 252/186 |
| 3,557,009 | 1/1971 | McCloskey et al. | 252/186 |
| 3,883,427 | 4/1975 | Sharp | 568/559 |
| 3,896,099 | 7/1975 | Jongh et al. | 260/93.5 R |
| 3,931,355 | 1/1976 | Rudolph et al. | 260/865 |
| 3,948,858 | 4/1976 | Akzu | 260/75 UA |
| 4,036,898 | 7/1977 | Oosterwij | 260/75 UA |
| 4,051,059 | 9/1977 | Bowing et al. | 252/186 |

FOREIGN PATENT DOCUMENTS

| 1024654 | 2/1958 | Fed. Rep. of Germany . |
|---|---|---|
| 1035363 | 7/1958 | Fed. Rep. of Germany . |
| 1216877 | 5/1966 | Fed. Rep. of Germany . |
| 2131633 | 1/1972 | Fed. Rep. of Germany . |
| 1475618 | 6/1977 | United Kingdom . |

*Primary Examiner*—Werren B. Lone
*Attorney, Agent, or Firm*—Connolly and Hutz

[57] ABSTRACT

Mixtures active as initiators for radical polymerization reactions comprising (1) from 1 to 99% by weight of a substituted diphenyl ethane; and (2) from 99 to 1% by weight of an organic peroxide, and a process for desensitizing organic peroxides.

2 Claims, No Drawings

PEROXIDE INITIATORS

Organic peroxides can be used for initiating radical polymerisation reactions. They decompose exothermically at a temperature characteristic of each peroxide and with a characteristic half-life period into radicals which initiate the polymerisation reaction. The exothermic decomposition can be explosive. It may be strongly catalysed by accelerators, for example, cobalt salts, vanadium salts and amines as well as by impurities, for example metal filings or rust. Peroxides may also be caused to explode by impact or friction.

Attempts have been made to overcome the danger involved in handling these substances by marketing peroxides in the form of pastes, dilute solutions or wet powders. The carriers used for pastes are generally silica derivatives, whilst the solvents used are mostly phthalic acid esters (e.g., dimethyl phthalate, dibutyl phthalate, and dioctyl phthalate) or high-boiling aliphatic hydrocarbons. However, these commercial formulations are still explosive in cases where highly reactive peroxides are used. However, the peroxides cannot be further diluted because the properties of the polymers produced by using them would suffer (for example, the solvents may have plasticiser properties).

Agents with which the dangerous nature of peroxides may be reduced are also known as "desensitisers".

The safety in handling of peroxides having low decomposition temperatures (for example percarbonates) cannot be improved by adding peroxides having high decomposition temperatures, i.e. by using quasi-"reactive" desensitisers. Even a few radicals formed from the peroxide of low decomposition temperature are sufficient to cause even the more stable peroxide to decompose.

The present invention is based on the discovery that the addition of diphenyl ethane derivatives to organic peroxides prevents the radical-induced spontaneous decomposition thereof.

Accordingly, the present invention relates to mixtures, active as initiators for radical polymerisation reactions, comprising
(1) from 1 to 99%, by weight, preferably from 40 to 99%, by weight, of a substituted diphenyl ethane; and
(2) from 99 to 1%, by weight, preferably from 60 to 1%, by weight, of an organic peroxide.

In these initiators, the induced decomposition of the radical-formers does not occur although they are composed of a peroxide and a radical-former of the diphenyl ethane type.

Substituted diphenyl ethanes (1) are known and are themselves used as initiators for radical polymerisation reactions (cf. German Auslegeschrift No. 1,216,877; German Offenlegungsschrift No. 2,131,633; 2,164,482; 2,444,252 and 2,545,451; U.S. Pat. No. 3,896,099 and British Pat. No. 1,475,618).

However, readily obtainable substituted diphenyl ethanes only act as polymerisation initiators at high temperatures, while the diphenyl ethanes active at lower temperatures are difficult to obtain and expensive. The combination of substituted diphenyl ethanes with organic peroxides gives highly active, readily obtainable and less dangerous catalysts which are catalytically active at low temperatures.

According to the present invention, in principle, any substituted 1,2-diphenyl ethanes are suitable, particularly those which can be used for initiating radical polymerisation reactions at temperatures of from 70° to 250° C., preferably from 70° to 170° C. Examples include: acetophenone-pinacol, benz-pinacol, 3,4-diphenyl-3,4-dimethyl hexane; 1,2-dichlorotetraphenyl ethane; tetraphenyl succinic acid dinitrile; 1,2-dicyano-1,2-diphenyl succinic acid dinitrile, 1,2-dicyano-1,2-diphenyl succinic acid ester and benz-pinacol alkyl and silyl ethers.

Organic peroxides which can be used for the purposes of the present invention are preferably organic peroxides which decompose into radicals at from 0° to 250° C., preferably from 40° to 180° C., and which can be used for initiating radical polymerisation reactions. Examples include: sulphonyl peroxides, such as acetyl cyclohexane sulphonyl peroxide; percarbonates, such as dicyclohexyl peroxy dicarbonate; di-n-butyl peroxy dicarbonate and diisopropyl peroxy dicarbonate; peresters, such as tert.-butyl peroxy pivalate, tert.-butyl perneodecanoate and tert.-butyl perbenzoate; diacyl peroxides, such as bis-(3,3,5-trimethyl-hexanoyl)-peroxide; dilauroyl peroxide; didecanoyl peroxide, dipropionyl peroxide; bis-(2,4-dichlorobenzoyl)-peroxide and dibenzoyl peroxide; dialkyl peroxides, such as dicumyl peroxide and di-tert.-butyl peroxide; ketal peroxides, such as 1,1-di-tert.-butyl peroxy-3,3,5-trimethyl cyclohexane; alkyl hydroperoxides, such as cumene hydroperoxide and tert.-butyl hydroperoxide, and ketone peroxides, such as cyclohexanone peroxide and ethyl methyl ketone peroxide.

The initiator mixtures according to the present invention may contain further additives, such as plasticisers, solvents and thixotropic agents. It is also possible to accelerate the decomposition of diacyl peroxides using amines and of ketone peroxides and peresters using respectively, cobalt and vanadium salts.

Monomers and monomer mixtures which can be polymerised using the catalyst system according to the present invention are listed below:

(A) Acrylic and methacrylic compounds:
Acrylic and methacrylic acids;

acrylic and methacrylic acid alkyl esters containing from 1 to 18, preferably from 1 to 8 carbon atoms in the alcohol component, such as methyl acrylate, ethyl acrylate, propyl acrylate, isopropyl acrylate, n-butyl acrylate, tert.-butyl acrylate, 2-ethyl hexyl acrylate, stearyl acrylate and the corresponding meth-acrylic acid esters;

acrylic acid and methacrylic acid cyclohexyl esters;

esters of acrylic acid and methacrylic acid with saturated, aliphatic diols containing from 2 to 4 carbon atoms, such as 2-hydroxyethyl acrylate, 2-hydroxy propyl acrylate, 4-hydroxy butyl acrylate and the corresponding methacrylic acid esters;

crosslinking acrylic and methacrylic compounds, such as acrylic and/or methacrylic acid allyl esters, methylene-bis-acrylamide, methylene-biss-methacrylamide, triacryloyl perhydro-S-triazine, bis-acrylates and bis-methacrylates of glycols and polyglycols containing from 2 to 20 carbon atoms, such as ethylene glycol di(meth)acrylate, propylene glycol di(meth)acrylate, 1,4-butylene glycol di(meth)acrylate, tetraethylene glycol di(meth)acrylate, tri(meth)acrylates of triethanolamine and trimethylolethane, propane, hexane and glycerol;

acrylic and methacrylic acid vinyl esters;
acrylonitrile and methacrylonitrile;
acrylamide and methacrylamide;

N-methylol ethers of acrylic and methacrylic acid amide corresponding to the following general formula:

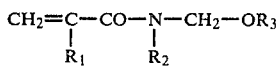

wherein
$R_1$ represents hydrogen or methyl;
$R_2$ represents hydrogen, alkyl, aralkyl or aryl;
$R_3$ represents alkyl or cycloalkyl, such as methyl, ethyl, n-propyl, isopropyl, n-butyl, isobutyl cyclohexyl; (cf. German Auslegeschrift No. 1,035,363); the N-methylol ethyl ether of methacrylic acid amide is preferred;
N,N-dialkyl-substituted acrylic and methacrylic acid amides; primary, secondary and tertiary aminoalkyl esters of acrylic and methacrylic acid.

(B) Polymerisable vinyl and vinylidene compounds:
Styrene; nucleus-chlorinated and -alkylated or -alkenylated styrenes, the alkyl groups containing from 1 to 4 carbon atoms, such as vinyl toluene, divinyl benzene, α-methyl styrene, tert.-butyl styrene, chlorostyrene; vinyl esters of carboxylic acids containing from 2 to 6 carbon atoms, such as vinyl acetate, vinyl propionate, succinic acid divinyl ester, vinyl pyridine, vinyl naphthalene, vinyl cyclohexane; vinyl ethers, such as vinyl propyl ether and vinyl isobutyl ether; maleic acid anhydride, semi- and di-esters containing from 1 to 4 carbon atoms in the alcohol component, semi- and di-amides or cyclic imides, such as N-methyl maleic imide or N-cyclohexyl maleic imide; allyl compounds, such as allyl benzene, allyl esters, such as allyl acetate, phthalic acid diallyl ester, iso-phthalic acid diallyl ester, maleic and fumaric acid di-allyl ester, allyl carbonates, diallyl carbonates, diallyl phenyl carbonates, triallyl phosphate, triallyl cyanurate and isocyanurate; isobutyl vinyl ether, 1,4-butane diol divinyl ether, ethylene glycol diallyl ether, pentaerythritol tetraallyl ether; vinyl pyrrolidone; vinyl chloride, vinylidene chloride.

(C) Ethylene.

(D) Conjugated dienes, such as butadiene, isoprene, chloroprene.

(E) Unsaturated polyester resins.

The polyester resins which can be accelerated using the compounds used in accordance with the present invention comprise from 40 to 80% by weight of α,β-ethylenically unsaturated polyesters and from 60 to 20% of vinyl or vinylidene compounds copolymerisable therewith.

α,β-ethylenically unsaturated polyesters are the conventional polycondensation products of at least one α,β-ethylenically unsaturated dicarboxylic acid, generally containing 4 or 5 carbon atoms, or its ester-forming derivatives, optionally in admixture with up to 90 mole %, based on the unsaturated acid components, of at least one aliphatic saturated dicarboxylic acid containing from 4 to 10 carbon atoms or a cycloaliphatic dicarboxylic acid containing from 8 to 10 carbon atoms or ester-forming derivatives thereof, with at least one polyhydroxyl compound, particularly a dihydroxy compound, containing from 2 to 8 carbon atoms, e.g., polyesters of the type described by J. Bjorksten et al in "Polyesters and their Applications", Reinhold Publishing Corp., New York, 1956.

Examples of the unsaturated dicarboxylic acids preferably used or derivatives thereof include: maleic acid or maleic acid anhydride and fumaric acid. However, it is also possible to use, for example, mesaconic acid, citraconic acid, itaconic acid or chloromaleic acid. Examples of the aliphatic saturated or cycloaliphatic dicarboxylic acids or derivatives thereof which can be used, include: phthalic acid or phthalic acid anhydride, iso-phthalic acid, terephthalic acid, hexa- or tetra-hydrophthalic acid or the anhydrides thereof, endomethylene tetrahydrophthalic acid or the anhydride thereof, succinic acid or succinic acid anhydride and succinic acid esters and chlorides, adipic acid and sebacic acid. In order to produce substantially non-inflammable resins, it is possible to use, for example, hexachloroendomethylene tetrahydrophthalic acid (HET acid), tetrachlorophthalic acid or tetrabromophthalic acid. Preferred polyesters contain maleic acid residues of which up to 25 mole % may be replaced by phthalic acid or iso-phthalic acid residues. Suitable dihydric alcohols include: ethylene glycol, 1,2-propane diol, 1,3-propane diol, diethylene glycol, dipropylene glycol, 1,3-butane diol, 1,4-butane diol, neopentyl glycol, 1,6-hexane diol, 2,2-bis-(4-hydroxy-cyclohexyl)-propane, bis-alkoxylated bisphenol A, and perhydrobisphenol.

Further modifications are possible by the incorporation of up to 10 mole %, based on the alcohol or acid component, of monohydric, trihydric and tetrahydric alcohols containing from 1 to 6 carbon atoms, such as methanol, ethanol, butanol, allyl alcohol, benzyl alcohol, cyclohexanol, tetrahydrofurfuryl alcohol, trimethylol propane, glycerol and pentaerythritol, and of mono-, di- and tri-allyl ethers and benzyl ethers of trihydric and higher polyhydric alcohols containing from 3 to 6 carbon atoms according to DT-AS No. 1,024,654, and by the incorporation of monobasic acids, such as benzoic acid, or long-chain, unsaturated fatty acids, such as oleic acid, linseed oil fatty acid and ricinene fatty acid.

The polyesters generally have acid numbers of from 1 to 100, preferably from 20 to 70, OH-numbers of from 10 to 150, preferably from 20 to 100, and molecular weights (measured as numerical averages=$\overline{M}n$) of from 500 to 5000, preferably from 1000 to 3000 (as measured by vapour pressure osmometry in dioxane and acetone; in the case of differing values, the lower value is regarded as the correct value).

The substances listed above under (B), preferably styrene, are suitable for use as vinyl and vinylidene compounds copolymerisable with the unsaturated polyesters.

The initiator combinations according to the present invention are particularly suitable for unsaturated polyester resins.

In the following Examples, parts are parts, by weight, and percentages %, by weight.

EXAMPLE 1

An oligomeric benz-pinacol silyl ether, obtained by reacting magnesium, benzophenone and trichloromethyl silane, is mixed in the form of a 70% solution in triethyl phosphate (initiator 1) with peroxides 1 to 5 in the ratios (a) to (g).

10 g samples of these mixtures are introduced into an 18 mm diameter test tube. An iron-Constantan thermocouple connected to a temperature-time recorder dips into this solution to a depth of 0.5 cm. After the recorder has been switched on, the test tube is placed in a thermostatically controlled oil bath. The maximum temperature ($T_m$) of the solution during decomposition of the initiator mixture and the period of time elapsing before the maximum temperature ($t_H$) is reached are determined by means of the thermocouple.

The following peroxides were thermally decomposed:

(1) dicyclohexyl peroxy dicarbonate (50% powder)
(2) tert.-butyl perneodecanoate (75% solution in aliphatic solvents)
(3) dibenzoyl peroxide (50% in plasticiser)
(4) 1,1-di-tert.-butyl peroxy-3,3,5-trimethyl cyclohexane (50% solution in dibutyl phthalate)
(5) tert.-butyl perbenzoate

| Peroxide | Mixture | Parts, by weight, peroxide | Parts, by weight, peroxide-free initiator 1 | Decomp. temperature | $T_m$ | $t_H$ |
|---|---|---|---|---|---|---|
| (1) | a | 40 | 60 | 80 | 145 | 2.0 |
|  | b | 20 | 80 | 80 | 135 | 2.0 |
|  | c | 10 | 90 | 80 | 110 | 3.5 |
|  | d | 5 | 95 | 80 | 85 | 4.5 |
|  | e | 2.5 | 97.5 | 80 | 80 | 6 |
|  | f | 1.25 | 98.75 | 80 | 80 | 6 |
|  | g | — | 100 | 80 | 80 | 6 |
| (2) | a | 40 | 60 | 80 | 130 | 2.5 |
|  | b | 20 | 80 | 80 | 120 | 2.5 |
|  | c | 10 | 90 | 80 | 95 | 3.5 |
|  | d | 5 | 95 | 80 | 85 | 3.5 |
|  | e | 2.5 | 97.5 | 80 | 80 | 6 |
|  | f | 1.25 | 98.75 | 80 | 80 | 6 |
| (3) | a | 40 | 60 | 120 | 160 | 2.2 |
|  | b | 20 | 80 | 120 | 145 | 2.8 |
|  | c | 10 | 90 | 120 | 135 | 3.5 |
|  | d | 5 | 95 | 120 | 126 | 5.0 |
|  | e | 2.5 | 97.5 | 120 | 120 | 6.0 |
| (4) | a | 40 | 60 | 120 | 190 | 4.0 |
|  | b | 20 | 80 | 120 | 145 | 4.5 |
|  | c | 10 | 90 | 120 | 125 | 5.5 |
|  | d | 5 | 95 | 120 | 120 | 5.0 |
|  | e | 2.5 | 97.5 | 120 | 120 | 5.0 |
| (5) | a | 40 | 60 | 120 | 180 | 4.0 |
|  | b | 20 | 80 | 120 | 155 | 4.0 |
|  | c | 10 | 90 | 120 | 140 | 3.5 |
|  | d | 5 | 95 | 120 | 130 | 3.5 |
|  | e | 2.5 | 97.5 | 120 | 120 | 5.0 |

EXAMPLE 2

An unsaturated polyester resin, produced from 11 parts of phthalic acid anhydride, 47 parts of maleic acid anhydride and 42 parts of 1,2-propylene glycol at 200° C. (acid number 20, OH-number 30, viscosity at 20° C.: 1500 cP), is dissolved in styrene to form a 66% solution and stabilised with 0.01 part of hydroquinone.

100 g samples of this unsaturated polyester resin are mixed with 1.5 parts, by weight, of initiator mixtures (1) to (5) as in Example 1 and stored at a maximum temperature of 20° C.

1 hour after the initiator has been added, 20 g of a resin mixture are introduced into an 18 mm diameter test tube. An iron-Constantan thermocouple connected to a temperature-time recorder is introduced into the resin to a depth of 3 cm and the test tube filled to 8 cm is placed in a thermostatically controlled oil bath after the recorder has been switched on. The hardening times $t_H$ (time taken to reach the peak temperature minus the time taken to exceed the 65° C. line) [minutes] and the peak temperature $T_m$ [°C.] are determined in accordance with DIN 16 945.

The following values are obtained at the bath temperatures indicated:

| Initiator mixture | | Bath temp. °C. | | | | | | | | | |
|---|---|---|---|---|---|---|---|---|---|---|---|
| | | 100 | | 90 | | 80 | | 70 | | 60 | |
| | | $t_H$ | $T_m$ | $t_H$ | $T_m$ | $t_H$ | $T_m$ | $t_H$ | $T_m$ | $t_H$ | $T_m$ |
| (1) | a | 0.7 | 240 | 0.8 | 240 | 1.0 | 240 | 1.8 | 240 | 2.5 | 225 |
|  | b | 1.2 | >250 | 1.5 | >250 | 2.0 | 240 | 3.5 | 240 | 4.5 | 210 |
|  | c | 1.7 | >250 | 2.0 | >250 | 3.5 | 235 | 6.0 | 230 | 8.0 | 195 |
|  | d | 2.1 | >250 | 3.0 | 250 | 5.0 | 235 | 11.0 | 210 | | |
|  | e | 2.8 | 250 | 4.3 | 245 | 9.0 | 225 | | | | |
|  | f | 4.0 | 250 | 6.0 | 235 | 13.5 | 200 | | | | |
|  | g | 5.2 | 250 | 9.0 | 225 | 14.5 | 190 | | | | |
| (2) | a | 0.7 | 240 | 0.8 | 240 | 1.3 | 245 | 2.6 | 240 | 5.0 | 220 |
|  | b | 1.2 | >250 | 1.7 | >250 | 2.6 | 245 | 5.0 | 235 | 10.5 | 200 |
|  | c | 1.8 | >250 | 2.8 | >250 | 4.5 | 245 | 7.0 | 230 | | |
|  | d | 2.5 | >250 | 4.0 | 245 | 6.5 | 230 | 13.5 | 205 | | |
|  | e | 3.5 | 250 | 5.5 | 235 | 10.0 | 220 | | | | |
|  | f | 5.0 | 240 | 7.2 | 230 | 14.0 | 210 | | | | |
| (3) | a | 2.6 | >250 | 4.0 | >250 | 7.8 | 235 | | | | |
|  | b | 3.4 | >250 | 5.0 | >250 | 9.0 | 235 | | | | |
|  | c | 4.0 | >250 | 6.2 | 250 | 10.0 | 230 | | | | |
|  | d | 4.7 | 250 | 7.5 | 240 | 12.0 | 210 | | | | |
|  | e | 5.2 | 240 | 9.0 | 225 | 14.5 | 200 | | | | |

| Initiator mixture | | Bath temp. °C. | | | | | | | |
|---|---|---|---|---|---|---|---|---|---|
| | | 120 | | 110 | | 100 | | 90 | |
| | | $t_H$ | $T_m$ | $t_H$ | $T_m$ | $t_H$ | $T_m$ | $t_H$ | $T_m$ |
| (4) | a | 2.0 | >250 | 2.4 | >250 | 3.0 | >250 | 6.0 | >250 |
|  | b | 2.3 | >250 | 2.7 | >250 | 3.5 | >250 | 7.0 | 250 |
|  | c | 2.5 | >250 | 3.0 | >250 | 4.0 | 250 | 7.5 | 245 |
|  | d | 2.8 | >250 | 3.3 | >250 | 4.5 | 245 | 8.0 | 240 |
|  | e | 2.8 | >250 | 3.7 | >250 | 5.0 | 245 | 8.5 | 230 |
| (5) | a | 2.2 | >250 | 2.8 | >250 | 4.5 | 250 | 8.6 | 240 |
|  | b | 2.2 | >250 | 2.8 | >250 | 4.5 | 250 | 8.6 | 235 |
|  | c | 2.5 | >250 | 3.0 | >250 | 4.5 | 250 | 8.6 | 235 |
|  | d | 2.5 | >250 | 3.2 | >250 | 4.7 | 245 | 9.0 | 230 |

|   |     |      |     |      |     |     |     |     |
|---|-----|------|-----|------|-----|-----|-----|-----|
| e | 2.8 | >250 | 3.5 | >250 | 5.0 | 250 | 9.0 | 230 |
| 1 g | 2.8 | >250 | 3.7 | >250 | 5.2 | 250 | 9.0 | 225 |

EXAMPLE 3

A 75% solution of tert.-butyl perneodecanoate in aliphatic solvents is mixed with initiators (A) to (E). The maximum temperature ($T_m$) of the solution during decomposition and the time ($t_H$) taken to reach the maximum temperature are determined as described in Example 1.

The following desensitising initiators are mixed with tert.-butyl perneodecanoate (75%):

(A) 50% solution of 2,2-diphenyl-2,2-dimethyl hexane in di-sec.-butyl benzene, (B) 50% solution of 2,2-diphenyl-2,2-dimethyl butane in isopropyl benzene, (C) 50% solution of 2,2-diphenyl-2,2-di-(chloromethyl)butane in isopropyl benzene, (D) 50% solution of

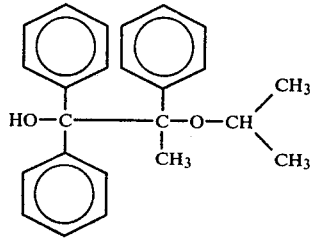

in dimethyl phthalate, (E) 50% solution of benz-pinacol in dimethyl phthalate.

| Bath temperature: 80° C. | | | | |
|---|---|---|---|---|
| Desensitising agent | | Parts, by weight, | | |
| Type | Parts, by weight | Peroxide | $T_m$ (°C.) | $t_H$ (mins) |
| (A) | 90 | 10 | 105 | 3.8 |
| (A) | 95 | 5 | 82 | 5.0 |
| (B) | 90 | 10 | 105 | 4.0 |
| (B) | 95 | 5 | 85 | 5.5 |
| (C) | 90 | 10 | 102 | 4.0 |
| (C) | 95 | 5 | 85 | 6.0 |
| (D) | 90 | 10 | 107 | 3.5 |
| (E) | 90 | 10 | 110 | 3.5 |
| (E) | 95 | 5 | 82 | 6.0 |

EXAMPLE 4

The procedure is as in Example 2, except that the unsaturated polyester resin is not hardened using initiator mixtures (1) to (5), but instead using 1.5 parts, by weight, of a mixture of tert.-butyl perneodecanoate (75% in aliphatic solvents) and an initiator of the diphenyl ethane type.

Samples containing only peroxide-free initiators were also hardened for comparison.

| Initiator of the diphenyl ethane type Parts, by weight | | Parts, by weight, perox-ide | Bath temp. (°C.) | | | |
|---|---|---|---|---|---|---|
| | | | 140 | | 130 | |
| | Type | | $t_H$ | $T_m$ | $t_H$ | $T_m$ |
| 90 | 2,2-diphenyl-2,2-dimethyl hexane | 10 | 1.4 | >250 | 1.6 | >250 |
| 95 | 2,2-diphenyl-2,2-dimethyl hexane | 5 | 1.5 | >250 | 2.0 | >250 |
| 100 | 2,2-diphenyl-2,2-dimethyl hexane | — | 6.9 | 250 | 11.2 | 250 |
| 90 | 2,2-diphenyl-2,2-di-(chloro-methyl)-butane | 10 | 1.4 | 250 | 1.6 | 245 |
| 100 | 2,2-diphenyl-2,2-di-(chloro-methyl)-butane | — | 8.7 | 245 | 13.0 | 235 |
| 90 | benz-pinacol | 10 | 1.2 | >250 | 1.4 | >250 |
| 95 | " | 5 | 1.4 | >250 | 1.7 | >250 |
| 100 | " | — | 2.4 | >250 | 3.1 | >250 |

We claim:

1. A mixture active as an initiator for a radical polymerization reaction comprising 1 to 99% by weight of a substituted 1,2-diphenyl ethane which initiates radical polymerization at a temperature of from 70° to 250° C. and 99 to 1% by weight of an organic peroxide which decomposes into radicals at a temperature of from 0° to 250° C.

2. A process for desensitizing an organic peroxide which decomposes into radicals at a temperature of from 0° to 250° C. which comprises diluting from 99 to 1% by weight of said organic peroxide with 1 to 99% by weight of a substituted 1,2-diphenyl ethane which initiates radical polymerization at a temperature of from 70° to 250° C.

* * * * *